No. 777,516. Patented December 13, 1904.

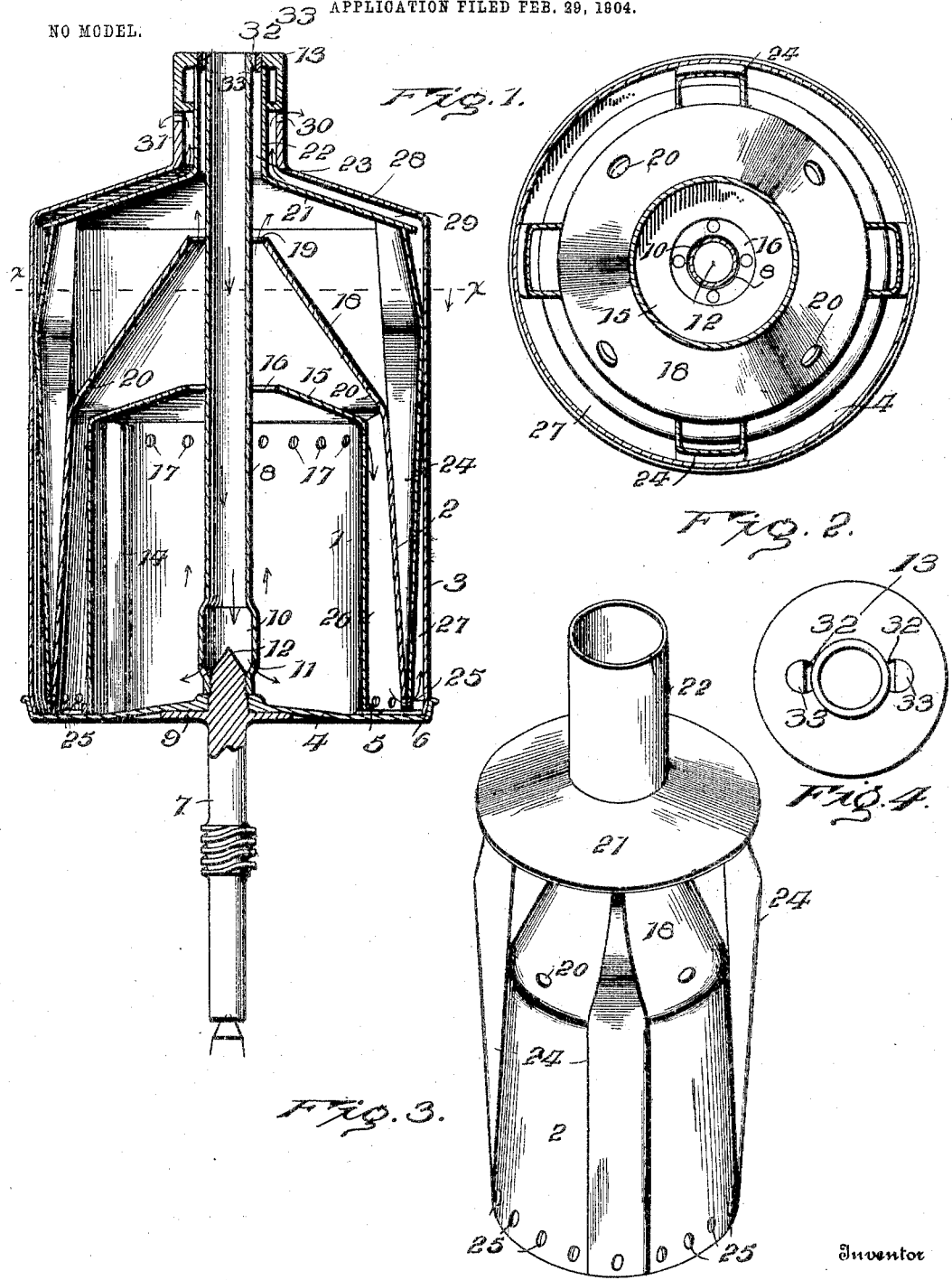

UNITED STATES PATENT OFFICE.

MANLEY KELLEY, OF COLO, IOWA.

CREAM-SEPARATOR.

SPECIFICATION forming part of Letters Patent No. 777,516, dated December 13, 1904.

Application filed February 29, 1904. Serial No. 195,926. (No model.)

*To all whom it may concern:*

Be it known that I, MANLEY KELLEY, a citizen of the United States, residing at Colo, in the county of Story and State of Iowa, have invented certain new and useful Improvements in Cream-Separators, of which the following is a specification.

This invention appertains to machines for separating cream from milk by centrifugal action, the chief object being to devise a mechanism which may be readily cleaned, is compact in the arrangement of its parts, and adapted to effect a separation of the cream by successive steps whereby all the cream is collected.

For a full description of the invention and the merits thereof and also to acquire a knowledge of the details of construction, of the means for effecting the result, reference is to be had to the following description and drawings hereto attached.

While the essential and characteristic features of the invention are susceptible of modification, still the preferred embodiment of the invention is illustrated in the accompanying drawings, in which—

Figure 1 is a vertical central section of a centrifugal cream-separator embodying the invention. Fig. 2 is a plan section on the line X X of Fig. 1. Fig. 3 is a perspective view of the outermost separating-shell. Fig. 4 is a top plan view of the cap.

Corresponding and like parts are referred to in the following description and indicated in all the views of the drawings by the same reference characters.

The machine comprises a series of separating-shells 1 and 2, having a concentric arrangement and located within the bowl 3, said shells being spaced from one another and from the bowl to provide annular passages for the circulation of the milk through the machine. The crowns of the several parts 1, 2, and 3 are upwardly converged or tapered to serve in the capacity of deflectors, so as to direct the cream toward the center or axial line of rotation of the machine. The bowl and separating-shells are mounted upon the base 4, which is preferably of circular form and is provided with vertical flanges 5 and 6 for centering the parts and preventing displacement thereof.

The shaft of the machine comprises a lower section 7 and an upper section 8, the latter being tubular and adapted to receive the new milk and direct the same into the lower portion of the machine. The lower section 7 is preferably solid and is adapted to have the power applied thereto in any determinate way. A shoulder 9 is provided near the upper end of the section 7 and limits the downward movement of the base 4. The end portion of the section 7, extended above the base 4, is threaded to receive the lower end of the tubular section 8, which also serves to clamp the base 4 upon the shoulder 9. The lower portion of the tubular section 8 is enlarged, as shown at 10, to form a chamber, and outlets 11 are provided in the lower portion of the walls of said chamber 10 for the escape of the new milk into the innermost separating-shell 1. The terminal portion of the section 7 projects into the chamber 10 and is pointed, as shown at 12, so as to divide the column of inflowing milk and direct the same through the outlets 11. The upper end of the tubular section 8 is externally threaded to receive a cap 13, which confines the bowl 3 and outermost separating-shell 2 upon the base 4. When the cap 13 is removed, the separating-shells and bowl may be lifted from the base 4 and are readily accessible for cleaning or other desired purpose.

The separating-shells are of varying height and are provided with inwardly-extended wings to form abutments to cause the milk to rotate with the machine without producing a vortex, which is detrimental to the efficiency of the machine. The innermost separating-shell 1 has the inner wing 14 and the upwardly-converged crown 15, which is spaced from the tubular section 8, so as to provide an annular escape 16 for the cream. A series of openings 17 are provided near the upper end of the shell 1 near the juncture of the crown 15 therewith, and these openings provide an escape for the milk during the initial process of separation. The separating-shell 2 is slightly tapered in an upward direction, and the crown 18 is upwardly converged and is spaced at its upper end from the tubular section 8 to provide an outlet 19 for the upward ascent of the cream. The crown 18 is considerably longer than the crown 15, and its base portion is provided with openings 20 for the outflow of the milk during the second stage of the separating process.

A deflector 21 is located above the series of separating-shells and is connected to the outermost separating-shell 2 and is upwardly converged and terminates in a tube 22, which is spaced from the upper end portion of the tubular section 8, as indicated at 23. A series of ribs 24 surround the outermost separating-shell 2 and serve to properly space it from the bowl 3, and these ribs project upward from the body of the shell and support the deflector 21. The ribs 24 are preferably formed of strips of sheet metal soldered to the outer side of the shell 2 and constructed substantially as shown to form the spacing-ribs. Openings 25 are formed in the lower portion of the shell 2 and permit the milk to pass from the space 26, formed between the shells 1 and 2, into the space 27, formed between the shell 2 and the bowl 3. The deflector 21 is spaced a short distance from the crown 28 of the bowl 3 to form a passage 29, through which the milk finds its way through the outlets 30, formed in the neck 31 of said bowl, and which outlets preferably consist of notches in the upper end of the neck.

The cap 13 makes screw-thread connection with the upper portion of the tubular section 8 and is adapted to close upon the upper ends of the tube 22 and neck 31, thereby confining the shell 2 and bowl 3 upon the base 4. The lower end of the cap 13 closes the space formed between the tube 22 and neck 31, and its crown is provided with openings 32, forming outlets for the escape of the cream passing upward into the space 23.

The parts being assembled substantially as shown in Fig. 1 and the machine being rotated at a high rate of speed and the milk to be separated supplied thereto through the tubular section 8 passes from said supply-tube into the lower portion of the separating-shell 1, and being rapidly rotated causes the milk to fly outward and the cream to move inward, and the inflow of the new milk causes the cream and milk to rise in the shell 1, the cream passing upward through the outlet 16 and the milk out through the openings 17 into the space 26, thence downward through said space and out through the openings 25 into the space 27. The milk in its passage through the space 26 is again submitted to a separating action, the cream passing upward along the inclined walls of the separating-shell 2 and along the under side of the crown 18 and out through the opening 19. The milk in its passage through the space 27 rises and flows outward through the space 29 into the space formed between the neck 31 and tube 22, thence out through the openings 30. Any trace of cream remaining in the milk is caught by the deflector 21 and directed inward and upward into the space 23, from which it passes outward along with the other cream through the openings 33 and 32, the milk and cream being collected in any approved manner. When it is required to cleanse the machine, the parts may be readily separated by removing the cap 13 in the manner stated.

In order to regulate the richness of the cream, the openings 32 in the crown of the cap 13 are provided with plugs 33, which have a side portion cut away, and by turning said plugs the openings formed by the cut-away portion may be moved to a greater or less distance from the axis of the machine within the range of the plug-openings. When the cut-away portions of the plugs are turned so as to occupy the nearest position possible to the axis of the machine, the richest cream possible is obtained, and when said plugs are turned so that their cut-away portions are farthest from the axis of the machine the cream is standard. Obviously by turning the plugs so that their cut-away portions occupy an intermediate position the richness of the cream may be varied.

Having thus described the invention, what is claimed as new is—

1. In a centrifugal cream-separator, the combination of a shaft having its upper portion tubular and threaded, a base supported upon said shaft, separating-shells and a bowl arranged upon said base, said bowl having an upwardly-converged crown terminating in a neck, a deflector located within the bowl and spaced a short distance from the crown thereof and terminating in a tube spaced from said shaft and from the neck of the bowl, and a cap threaded to the shaft and adapted to confine the bowl upon the base and to make a close joint with the tube of said deflector, substantially as set forth.

2. In a centrifugal cream-separator, the combination of a shaft having its upper portion tubular and constituting an inflow or supply pipe, a base supported by means of said shaft, a bowl resting upon the base, a series of separating-shells for successive operation in effecting separation of the milk, the shells being tapered to form an upwardly-converged space, upwardly-converged crowns extended from the respective shells and spaced from the aforesaid shaft, a deflector spaced a short distance from the crown of the bowl, ribs for spacing the outermost separating-shell from the bowl and extended to support said deflector, and means for confining the bowl upon the base and fitted to said shaft, substantially as set forth.

In testimony whereof I affix my signature in presence of two witnesses.

MANLEY KELLEY. [L. S.]

Witnesses:
W. M. PATTERSON,
CHAS. YEAGER.